United States Patent
Gupta et al.

(10) Patent No.: US 9,158,921 B1
(45) Date of Patent: Oct. 13, 2015

(54) SECURE BOOT ON DEEP SLEEP WAKE-UP

(71) Applicants: Ruchika Gupta, Delhi (IN); Aneesh Bansal, Delhi (IN); Kalyana E. S. Chakravarthy, Noida (IN); Ankit Pal, Noida (IN)

(72) Inventors: Ruchika Gupta, Delhi (IN); Aneesh Bansal, Delhi (IN); Kalyana E. S. Chakravarthy, Noida (IN); Ankit Pal, Noida (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 45 days.

(21) Appl. No.: 14/274,770

(22) Filed: May 12, 2014

(51) Int. Cl.
G06F 7/04 (2006.01)
G06F 21/57 (2013.01)
G06F 9/44 (2006.01)
G06F 1/32 (2006.01)

(52) U.S. Cl.
CPC ............... *G06F 21/575* (2013.01); *G06F 1/32* (2013.01); *G06F 9/4418* (2013.01); *G06F 2221/034* (2013.01)

(58) Field of Classification Search
CPC ..... G06F 21/51; G06F 21/575; G06F 9/4418; G06F 21/79; G06F 2221/034
USPC ................................. 713/2, 193, 168; 726/17
See application file for complete search history.

(56) References Cited

U.S. PATENT DOCUMENTS

| | | | | |
|---|---|---|---|---|
| 7,065,651 B2 * | 6/2006 | Evans | ..................... | G06F 21/84 380/52 |
| 7,284,136 B2 * | 10/2007 | Zimmer | ................ | G06F 1/3203 713/1 |
| 7,822,960 B2 | 10/2010 | Zimmer et al. | | |
| 7,945,786 B2 * | 5/2011 | Kumar | .................. | G06F 9/4418 380/44 |
| 8,086,839 B2 | 12/2011 | Yao et al. | | |
| 8,286,011 B2 | 10/2012 | Satsangi et al. | | |
| 2003/0068024 A1 * | 4/2003 | Jones | ....................... | H04L 12/12 379/102.04 |
| 2007/0206211 A1 * | 9/2007 | Okutsu | .................. | G03G 15/50 358/1.14 |
| 2008/0222423 A1 | 9/2008 | Rodriguez | | |
| 2008/0244292 A1 * | 10/2008 | Kumar | .................. | G06F 9/4418 713/323 |
| 2009/0089588 A1 * | 4/2009 | Adrangi | .................. | G06F 21/88 713/183 |
| 2011/0307709 A1 * | 12/2011 | Cox | ........................ | G06F 21/80 713/183 |
| 2013/0239206 A1 * | 9/2013 | Draluk | .................... | G06F 21/00 726/19 |
| 2013/0346775 A1 | 12/2013 | Srivastava et al. | | |

* cited by examiner

*Primary Examiner* — Samson Lemma
(74) *Attorney, Agent, or Firm* — Charles Bergere

(57) ABSTRACT

A processing system has a stored, encrypted data structure that is decrypted to provide verification data values. System data values are retrieved from locations distributed about a memory storing system data. The verification data values are compared with corresponding system data values to determine if a predetermined threshold of verification data values matches the system data values. The system resumes operation if the predetermined threshold is met.

7 Claims, 5 Drawing Sheets

US 9,158,921 B1

SECURE BOOT ON DEEP SLEEP WAKE-UP

BACKGROUND OF THE INVENTION

The present invention relates generally to processing systems and, more particularly, a method and system for resuming operation of a processing system from a sleep state.

Processing systems such as computer systems or systems on a chip (SOC) often have various modes of operation, such as functional mode, sleep mode, and deep sleep mode. The system has a certain configuration in each of its modes and must run a certain procedure to transition or switch from one mode to another. In the sleep state one or more components of the system may be powered-off or configured to operate in a power-saving mode. The sleep state may be a deep sleep mode in which a majority of components of the system are powered off. Data used by the system may be saved to a memory device in the sleep state. To resume operation from the sleep state, a boot or power-up procedure is performed in which data necessary to resume operation is loaded from the memory device.

It is desired for the resume operation to be fast—such as within 1 second—and secure. In order to provide security against data corruption or malicious intervention with the data stored in the memory device, the data should be authenticated. In some approaches a cryptographic operation such as a hash of a boot image stored in the memory device is determined and compared against a result of a second cryptographic operation obtained from a previously stored signature for the image. The result of the second cryptographic operation may be obtained by decrypting the signature. However this process is time-consuming in that it requires a cryptographic operation to be performed on the entire boot image and decryption of the signature to obtain the second result.

Furthermore, in some systems, a two-stage resume process is used. In a first stage of the process, instructions stored in a secure-boot ROM are executed to load a first-level boot image from non-volatile memory, which may be located off-chip, to on-chip memory. The instructions in the secure-boot ROM then authenticate the first-level boot image before a processor of the system begins to operate from the first-level image. In a second stage, a second-level boot image, such as containing an operating system, is loaded into external memory before the processor authenticates the second-level image. This approach is time consuming since authentication is performed twice. Thus, it would be advantageous to have a fast and secure method to transition from one state to another state.

BRIEF DESCRIPTION OF THE DRAWINGS

The invention, together with objects and advantages thereof, may best be understood by reference to the following description of preferred embodiments together with the accompanying drawings in which.

DETAILED DESCRIPTION OF PREFERRED EMBODIMENTS

Figure 1:
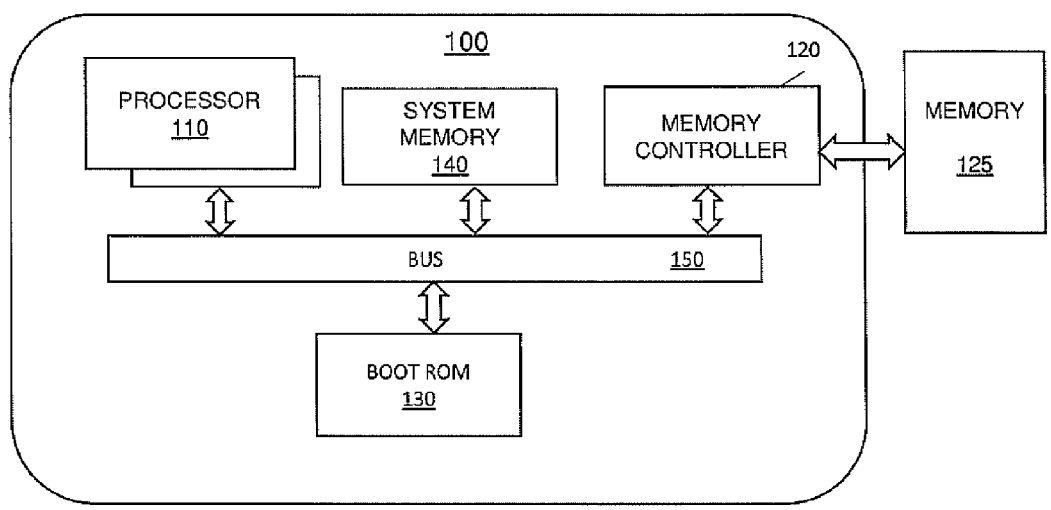
FIG. 1 is a schematic block diagram of a processing system according to an embodiment of the invention.

The detailed description set forth below in connection with the appended drawings is intended as a description of presently preferred embodiments of the invention, and is not intended to represent the only forms in which the present invention may be practised. It is to be understood that the same or equivalent functions may be accomplished by different embodiments that are intended to be encompassed within the spirit and scope of the invention. In the drawings, like numerals are used to indicate like elements throughout. Furthermore, terms "comprises," "comprising," or any other variation thereof, are intended to cover a non-exclusive inclusion, such that module, circuit, device components, structures and method steps that comprises a list of elements or steps does not include only those elements but may include other elements or steps not expressly listed or inherent to such module, circuit, device components or steps. An element or step proceeded by "comprises . . . a" does not, without more constraints, preclude the existence of additional identical elements or steps that comprises the element or step.

In one embodiment, the present invention provides a method of resuming operation of a processing system from a low-power state, such as a sleep or deep sleep mode. In the method, a data structure is decrypted to provide a plurality of verification data values. The verification data values are values of memory locations used to store system data prior to the system entering the low-power state. Current values of the memory locations storing the system data are obtained from a memory with which the system is communicably coupled. A comparison is performed between the verification data values and the system data values. The processor system resumes operations if a predetermined threshold of values match.

In another embodiment, the present invention provides a method and apparatus to securely resume operations by authenticating data stored in selected locations distributed throughout a memory storing system data.

Referring now to FIG. 1, a schematic block diagram of a processing system 100 according to an embodiment of the invention is shown. The system 100 may be a system on chip (SoC) implemented on a single integrated circuit, although the present invention is not limited in this respect. The system 100 comprises at least one processor or processing core 110, a memory controller 120 for communicating with a memory device 125, which may be external to the system 100, a boot ROM 130 for storing instructions for implementing a method according to an embodiment of the invention, a system memory 140, which may be on-chip memory, and an interconnect or bus 150 for allowing the system components to communicate. The processor 110 may include one or more registers for storing data.

Figure 2:
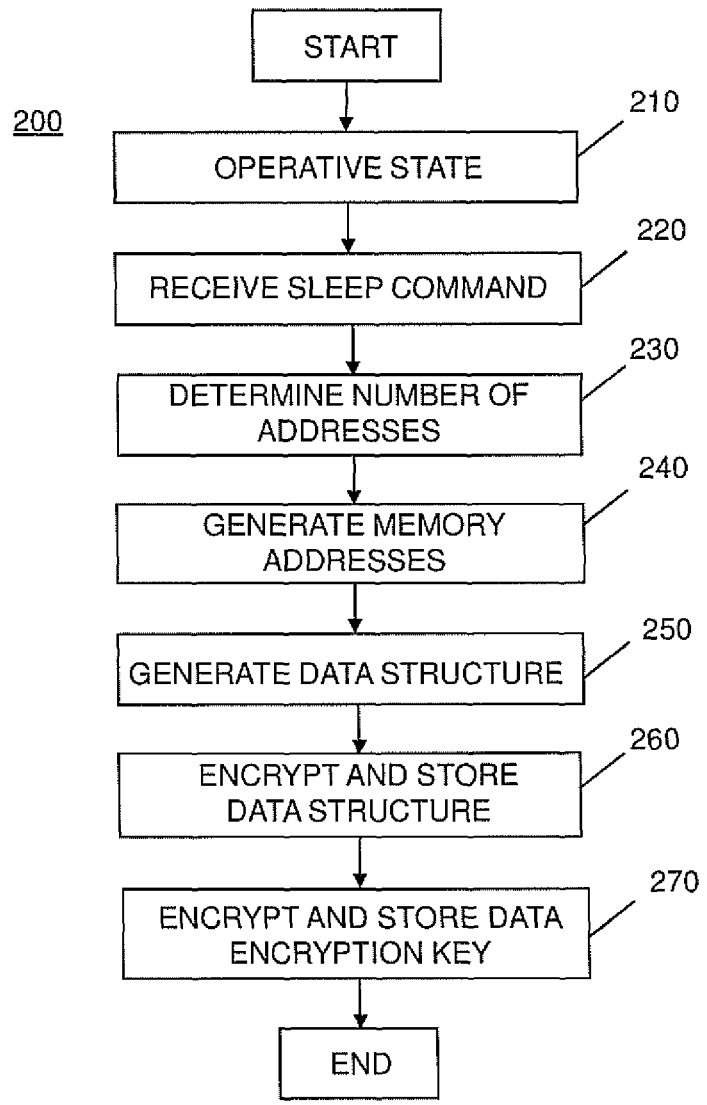
FIG. 2 is a flow chart of a method according to an embodiment of the invention.
Figure 3:
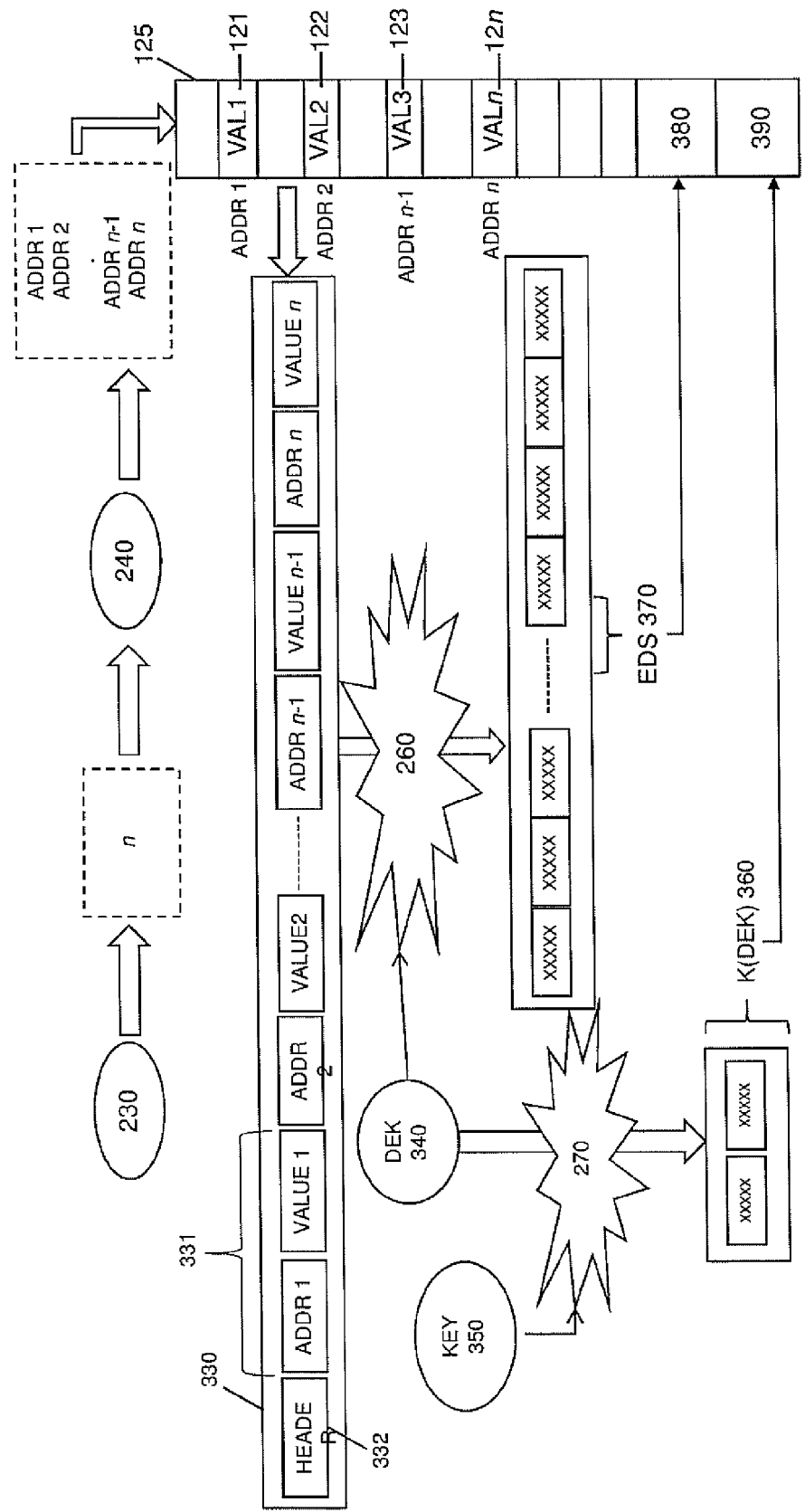
FIG. 3 is a diagram schematically illustrating operation of the method of FIG. 2.

FIG. 2 illustrates a method 200 of entering a sleep-state, such as a deep sleep mode, according to an embodiment of the invention and FIG. 3 schematically illustrates steps of the method 200 in conjunction with at least parts of the system 100.

In an operative state, e.g., functional mode, of the system 100, as in step 210, the processor 110 executes instructions and reads/writes data to the memory device 125 via the memory controller 120. The memory device 125 may store an operating system and other data used by the system 100, herein together referred to as system data. It should be understood that the memory device 125 may be used to store other data.

In step 220 a sleep command is received to cause the system 100 to enter a low-power or sleep-state, such as a deep sleep mode. The sleep command may be generated internal to the processor 110, such as by a timer indicative of the system having been idle for a predetermined period of time. Alternatively the sleep command may be received from an external source such as from user interaction or from, for example, a sensor determining that a lid of a computing device has been closed. It should be understood that the afore-mentioned sources of the sleep command are not limiting.

In step 230 a number n is determined that is indicative of a number of memory addresses, or memory locations, in the memory device 125 on which authentication of the system data will be performed when the system resumes operation (wakes up) from the sleep-state, such as via a boot method. The number n may be generated in a random or pseudo-random manner, for example based on a seed value. In this way, in some embodiments, the number of memory addresses used to perform authentication of the system data will vary between resume operations, thus making malicious intervention more difficult. In some embodiments n may have a predetermined minimum value.

In step 240 n memory addresses are generated. The memory addresses may be randomly, or pseudo-randomly, determined. The memory addresses are indicative of n locations in the memory device 125 from which data is used to create an authentication data structure for authenticating the system data during the resume operation. The n memory addresses are distributed about a region of the memory device 125 storing the system data. That is, the memory addresses may identify non-contiguous memory locations storing system data. Step 240 may comprise reading data at each of the memory addresses from the memory device 125.

Thus, as a result of steps 230 and 240, data is obtained from n memory addresses in the memory device 125. The memory addresses are illustrated in FIG. as ADDR 1, ADDR 2, ..., ADDRn−1, ADDR n, and contain data VAL1, VAL2, VAL3, VALn 121, 122, 123, 12n, respectively. Steps 230 and 240 therefore represent a selection of data distributed about the memory device 125.

In step 250, a data structure 330 is generated based on the data from the n memory addresses. The data structure 330 stores data indicative of each of the memory addresses determined in step 240 and data indicative of the data obtained from each of the addresses in the memory device 125. The data in the data structure may be referred to as verification data for verifying the system data in the resume operation. In one embodiment the data structure comprises n address-value pairs 331 (only one of which is numbered for clarity) where the address is indicative of an address in the memory device 125 determined in step 240 and the value is indicative of the data stored in the memory device 125 at that address. It will be realised that the data structure may be arranged differently, for example the n addresses may be stored separately from the n data values obtained from the memory device 125. In some embodiments the data structure may comprise a portion 332 comprising data indicative of the number n of memory addresses determined in step 230. The portion 332 may be a header 332 of the data structure 330 as shown in FIG. 3. The portion 332 may comprise other data such as a preamble of the data structure.

At step 260, the data structure 330 is encrypted and stored. The data structure 330 is encrypted by performing an encryption algorithm on the data structure 330 using a data encryption key (DEK) 340. The DEK 340 may be generated, such as in step 260, in a random process. In this way the DEK 340 is unique for each performance of the method 200 i.e., a different DEK is used each time the system 100 enters the sleep state. Thus as a result of step 260 an encrypted data structure (EDS) 370 is generated and stored in the memory device 125, such as in a region 380 of the memory device 125.

In order to securely store the DEK 340 for use during the resume operation, in step 270, the DEK 340 is encrypted and stored in the memory device 125. The DEK 340 is encrypted with a secret key 350 of the system 100. The secret key is only available within the system 100, such as a secret key securely stored within the SoC device. The secret key 350 may be permanently stored in the system 100, such as in a read-only register. The encrypted DEK 360 may be stored in a region 390 of the memory device 125 as shown in FIG. 3.

As a result of the method 200 the encrypted data structure (EDS) 370 and encrypted DEK 360 are stored for use by the system during the resume operation to authenticate the system data stored in the memory device 125. The encrypted data structure 370 stores selected portions of the system data in encrypted form. The regions 380, 390 of the memory 125 used to store the EDS 370 and the encrypted DEK 360 may, in some embodiments, be randomly chosen, for example at locations determined in steps 260 and 270, respectively, such that security is improved. Data indicative of the locations of the EDS 370 and the encrypted DEK 360 in the memory device 125 may be stored in the system 100, such as in one or more registers of the processor 110.

Following the method 200, the system 100 may enter the sleep state where one or more portions of the system 100 are at least partly disabled to reduce power consumption.

Figure 4:
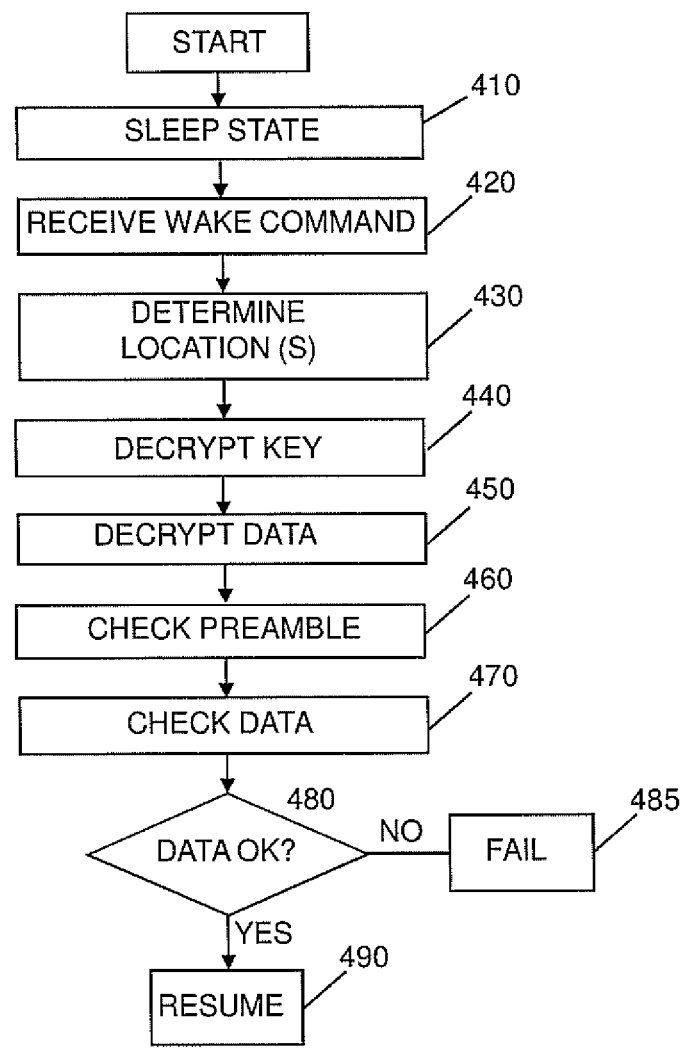
FIG. 4 is a flow chart of method according to a further embodiment of the invention.
Figure 5:
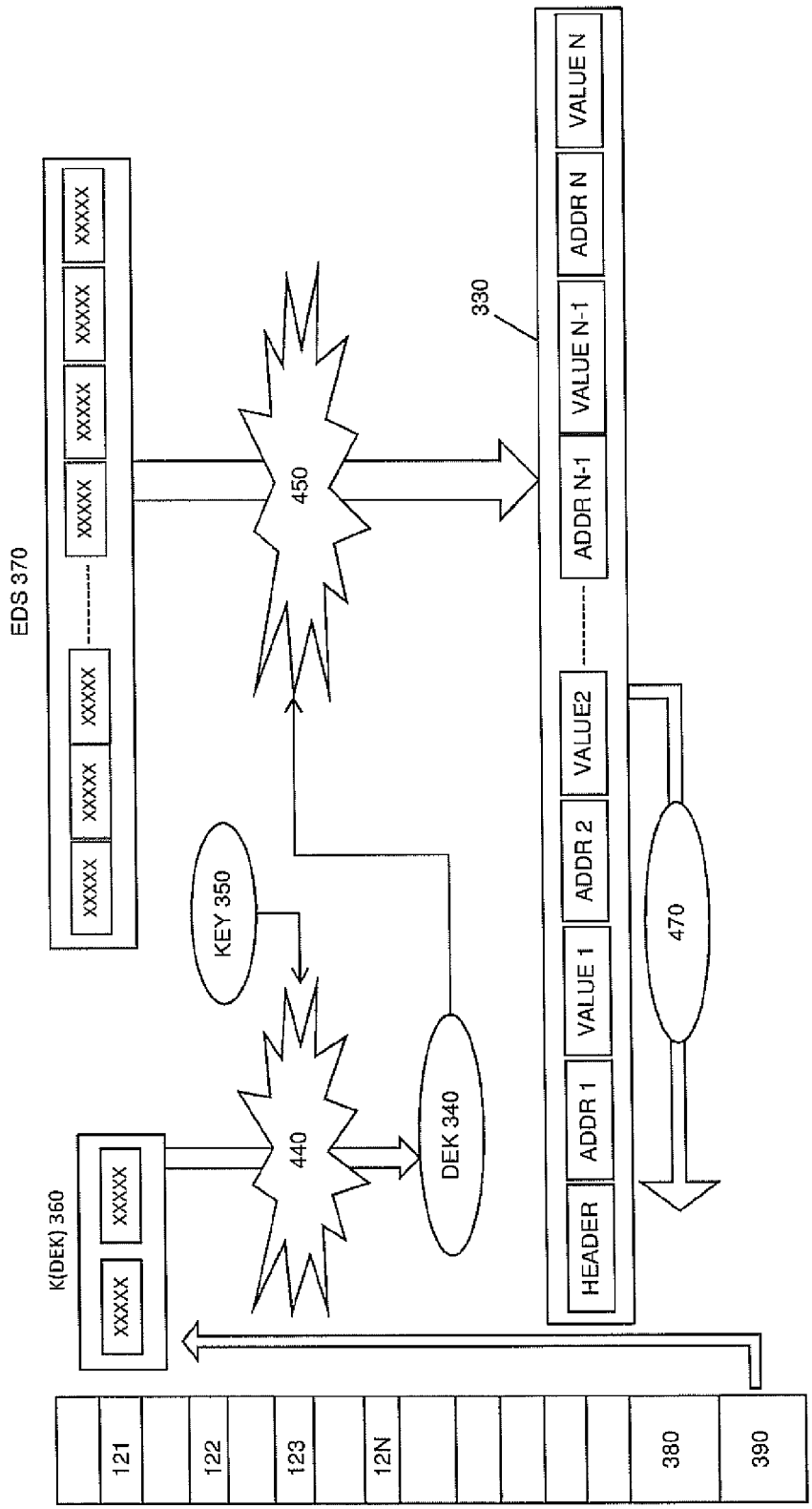
FIG. 5 is a diagram schematically illustrating operation of the method of FIG. 4.

FIG. 4 illustrates a method of waking up or resuming operation 400 according to an embodiment of the invention. The method 400 is a method of resuming operation from the sleep state and authenticating system data. FIG. 5 schematically illustrates steps of the method 400 in conjunction with at least some parts of the system 100.

In step 410 the system 100 is the sleep state, where the system 100 is configured to operate at a reduced power level. The sleep state 410 is operative after the method 200 previously described has been performed. The sleep state 410 may be a deep sleep state in which the power consumption of the system 100 is significantly reduced with one or more portions of the system 100 being disabled.

At step 420, a command is received to awaken from the sleep state, thus transitioning from the sleep mode to a functional mode. The command may be received from a source external to the system 100, such as in response to a user interaction with the system for example the user opening the lid of the computing device or operating a control of the device, or internal to the processor 110 such as responsive to a timer. It will be realised that other sources of the command may be envisaged.

At step 430, a location of the EDS 370 is determined. The location of the EDS 370 may be determined, in some embodiments, by retrieving data indicative of the location of the EDS 370 stored in the system 100. The location of the EDS 370 in the memory device 125 may be determined. The data indicative of the location may be obtained, in some embodiments, from one or more registers of the processor 110.

Step 430 may comprise determining a location of the encrypted DEK 360. The location of the encrypted DEK 360 may be determined in some embodiments by retrieving data indicative of the location stored in the system 100. The location of the encrypter DEK 360 in the memory device 125 may be determined. The data indicative of the location may be obtained, in some embodiments, from one or more registers of the processor 110.

At step 440, the DEK 340 is obtained. The DEK 340 is obtained by decrypting the encrypted DEK 360. The encrypted DEK 360 is decrypted with the secret key 350 of the system 100. Thus, as a result of step 440, the system 100 obtains the DEK 340 which may be used to decrypt the EDS 370.

At step 450, the EDS 370 is decrypted. Prior to decryption being performed, step 450 may comprise obtaining the EDS 370 from the memory device 125 based on the location determined in step 430. The decrypted data structure 330 may be held in the system memory 140 for use by the processor 110. The data structure provides a plurality of verification data values for verifying corresponding system data values in the memory device 125.

At step 460, an integrity of the data structure 330 may be checked. The integrity of the data structure 330 may be checked by verifying the preamble of the data structure 330 located in the header 332.

If the integrity of the data structure 330 is determined, then in step 470 system data stored in the memory device 125 is authenticated based on the data structure 330. The system data is authenticated by comparing system data from selected locations within the memory device 125 against at least some of the data in the data structure 330. Step 470 may comprise obtaining a first address and data value pair 331 from the data structure 330. It will be noted that the first address-value pair 331 is not necessarily that located at a head of the data structure, but may be selected from a position within the data structure 330. Data is obtained from the memory device 125 corresponding to the address of the address-value pair 331. Step 470 may further comprise obtaining up to n address-value pairs from the data structure 330 and corresponding data from up to n addresses within the memory device 125.

At step 480, it is determined whether the system data in the memory device 125 is authenticated. The system data in the memory device 125 is authenticated by comparing the selected data obtained in step 470 against data from the data structure 330. For example, the value of the first address-value pair 331 is compared against a data value obtained from the memory device 125 at the address indicated by the address of the address-value pair 331. The comparison may be repeated for up to the n address-value pairs in the data structure 330. Based on a result of the comparison the system data is authenticated. In one embodiment the system data may be authenticated when all data in the data structure matches that in the memory device 125. However, in other embodiments, the system data is authenticated when a predetermined threshold of data in the data structure 330 matches that at corresponding locations in the memory device 125.

If the system data is authenticated then the method moves to step 490 wherein operation of the system 100 continues. For example the system 100 may proceed further with resuming from the sleep-state. In one embodiment control may pass to the operating system residing in the system data. However if the system data is not authenticated in step 480 then the method moves to step 485. In step 485 various actions may be taken. In one embodiment a reset of the system 100 may be performed in step 485.

Advantageously, the present invention provides a system and method for resuming from a sleep state which authenticates system data. The system data may be authenticated to reduce a likelihood of system data corruption or malicious intervention with the system data. Embodiments of the invention may allow faster authentication of system data, and consequently resuming from a sleep-state, due to only selected portions of system data being verified. The selected portions may be randomly selected thereby improving security. The number and locations of the selected portions may be randomly chosen. By randomly selecting the portions it is not possible for an attacker to know in advance one or both of a number or location of the selected portions. It may therefore be quicker to encrypt and store the selected portions of system data which reduces a memory requirement to store validation data and a speed of performing encryption and decryption.

Embodiments of the present invention may be useful in devices such as, although not limited to, computing devices, routers, printing devices, set-top boxes and other devices including at least one processor.

The description of the preferred embodiments of the present invention has been presented for purposes of illustration and description, but is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiment disclosed, but covers modifications within the spirit and scope of the present invention as defined by the appended claims.

The invention claimed is:

1. A secure boot method of a processor for wake-up from a deep sleep mode, the method comprising:
    reading a stored data structure to provide a plurality of verification data values;
    retrieving a plurality of system data values from a memory storing system data, wherein the system data values are retrieved from memory locations distributed about the memory;
    comparing, by a processor, each of the verification data values with corresponding system data values; and
    resuming operation of the processor if a predetermined threshold of verification data values match the system data values;
    the stored data structure comprises a plurality of verification data and address value pairs; wherein the stored data structure is encrypted;
    decrypting a stored data encryption key with a secret key; and
    decrypting the stored data structure with the data encryption key.

2. The method of claim 1, wherein the stored data structure provides, for each verification data value, an address in the memory of the corresponding system data value.

3. The method of claim 1, further comprising retrieving the encrypted data encryption key from the memory.

4. The method of claim 1, further comprising determining, from the stored data structure, a number of system data values to retrieve from the memory.

5. The method of claim 1, wherein the stored data structure is encrypted, the method further comprising retrieving the encrypted data structure from the memory.

6. The method of claim 5, further comprising retrieving, from a storage location within the processor, data indicative of a location in the memory of the encrypted data structure.

7. A processing system, comprising: a processor; a memory for storing system data;
    a memory interface coupled to the processor and the memory enabling the processor to interface with the memory; and
    a non-volatile memory for storing instructions for resuming operation from a low-power state, wherein the instructions cause the processor to execute a method, comprising:
    a stored data structure comprises a plurality of verification data and address value pairs; wherein the stored data structure is encrypted;
    decrypting a stored data encryption key with a secret key;

and decrypting the stored data structure, with the data encryption key, to provide the plurality of verification data values;

retrieving a plurality of system data values from the memory, the system data values being retrieved from memory locations distributed about the memory;

comparing each of the verification data values with corresponding system data values; and resuming operation if a predetermined threshold of verification data values matches the system data values.

\* \* \* \* \*